United States Patent [19]

Yoshida

[11] Patent Number: 5,012,644
[45] Date of Patent: May 7, 1991

[54] AUTOMATIC SPEED CHANGING APPARATUS

[76] Inventor: Tokuichiro Yoshida, 13-14 Ise-cho, Kawasaki-ku Kawasaki-shi, Japan

[21] Appl. No.: 320,593

[22] Filed: Mar. 8, 1989

[51] Int. Cl.$^5$ ............................................. F16D 31/02
[52] U.S. Cl. ....................................... 60/425; 60/464; 60/468; 60/483; 60/494
[58] Field of Search ................. 60/413, 414, 420, 425, 60/464, 468, 494, 483, 484; 91/519

[56] References Cited

U.S. PATENT DOCUMENTS

| | | | |
|---|---|---|---|
| 2,370,526 | 2/1945 | Doran | 60/425 |
| 2,374,588 | 4/1945 | Doran | 60/425 |
| 2,500,627 | 3/1950 | Chinn | 60/425 X |
| 2,616,259 | 11/1952 | Quintilian | 60/425 |
| 3,762,164 | 10/1973 | Bessette | 60/425 |
| 3,958,419 | 5/1976 | Laing | 60/425 X |
| 4,579,044 | 4/1986 | Johnson | 60/425 X |

FOREIGN PATENT DOCUMENTS

| | | | |
|---|---|---|---|
| 2555962 | 6/1977 | Fed. Rep. of Germany | 60/483 |
| 2720710 | 11/1978 | Fed. Rep. of Germany | 60/464 |

*Primary Examiner*—Edward K. Look
*Attorney, Agent, or Firm*—Fleit, Jacobson, Cohn, Price, Holman & Stern

[57] ABSTRACT

An automatic speed changing apparatus, employable for a motorcar, which includes a hydraulic pump on the driving side mounted on a driving shaft, a plurality of hydraulic motors on the driven side mounted on a driven shaft, a distributor including a cylinder and a piston slidably received in the cylinder, a hydraulic oil collecting pipe having a large diameter in which working hydraulic oil is stored for the hydraulic pump and motors on both the driving and driven sides, an idling lever pivotally supported in the cylinder to be operable during a period of idling and a piston lever for displacing the piston axially in the cylinder during normal operation and during a period of engine braking. A plurality of distributor ports are formed in the cylinder in equally spaced relationship in the axial direction, one of the distributor ports located nearest to the head section of the cylinder communicating with the outlet port of the hydraulic pump and the other distributor ports communicating with the inlet ports of the hydraulic motors, whereby pressurized hydraulic oil from the hydraulic pump is transmitted to the hydraulic motors via the distributor ports in the cylinder. During a period of idling, the piston is displaceable in the forward position, and during a period of engine braking it is displaceable in the rearward direction.

15 Claims, 3 Drawing Sheets

AUTOMATIC SPEED CHANGING APPARATUS

BACKGROUND OF THE INVENTION

1. Field of the Invention

The present invention relates to an automatic speed changing apparatus preferably employable for a motorcar. The present invention may be applied to an automatic speed changing apparatus which is usable for many kinds of mechanisms for transmitting a rotational force.

2. Description of the Prior Art

As is well known, two types of speed changing apparatuses have been heretofore used for motorcars, one of them being a manual type speed changing apparatus and the other one being an automatic speed changing apparatus. With the conventional manual type speed changing apparatus, there is a need of disengaging a clutch from an engaged state at every time when a gear position is shifted to another one to adapt to the current running state of a motorcar. To this end, time and labor are required to disconnect the clutch from an engaged state and bring it in the engaged state and vice versa. In addition, to compensate the reduction of speed when gears are shifted to other positions, an acceleration pedal should be depressed by a driver to increase the number of revolutions of an engine just before the clutch is disengaged from the engaged state and when it is brought in the engaged state again. This causes fuel to be consumed uselessly. Further, to increase the running speed from a lower level to a higher level, the clutch, should be repeatedly disengaged from the engaged state and brought in the engaged state, resulting in the motorcar failing to be accelerated smoothly. Another problem inherent to the conventional speed changing apparatus is that energy is consumed uselessly because power transmission is achieved in the presence of friction between adjacent clutch plates with some slippage occuring therebetween while the clutch is disengaged from the engaged state and then brought in the engaged state.

On the other hand, with respect to the conventional automatic speed changing apparatus it has been pointed out as problems that it is complicated in structure, it requires many structural components, it can not be easily repaired when some trouble takes place with it, it is designed and constructed in larger dimensions as a whole and moreover it requires a wide space for mounting it on a motorcar.

SUMMARY OF THE INVENTION

The present invention has been made with the foregoing background in mine and its objects resides in providing an automatic speed changing apparatus which is entirely free from the aforementioned problems.

To accomplish the above object, there is provided according to one aspect of the present invention an automatic speed changing apparatus comprising at least one hydraulic pump on the driving side, the hydraulic pump being mounted on a driving shaft, a plurality of hydraulic motors on the driven side, the hydraulic motors being mounted on a driven shaft in equally spaced relationship, a distributor comprising a cylinder and a piston slidably received in the cylinder which is formed with a plurality of ports corresponding to the hydraulic pump on the driving side and the hydraulic motors on the driven side in equally spaced relationship as viewed in the axial direction, the piston being normally biased toward a head section of the cylinder under the effect of a predetermined intensity of resilient force of a coil spring, the head portion of the cylinder including a first hydraulic chamber and a second hydraulic chamber both of which are secured thereto in a side-by-side relationship, the first hydraulic chamber being communicated with the head section of the cylinder via a communication hole adapted to be closed with an one way-valve which is opened only during a period of idling and the second hydraulic chamber being communicated with the first hydraulic chamber via a communication hole adapted to be closed with another one-way valve which is opened against the resilient force of a coil spring in the second hydraulic pressure when hydraulic pressure in the first hydraulic chamber is raised up to a predetermined level of pressure, a hydraulic oil collecting pipe having a large diameter to which a plurality of pipings are connected, one of the pipings being communicated with the suction port of the hydraulic pump on the driving side and the other ones being communicated with the delivery ports of the hydraulic motors on the driven side, the first-mentioned piping being communicated via the hydraulic pump on the driving side with a piping extending from the delivery port thereof to the port located nearest to the head section of the cylinder and the second-mentioned pipings being communicated via the hydraulic motors on the driven side with pipings extending from the suction ports thereof to the other ports on the cylinder, the hydraulic collecting pipe being communicated with the second hydraulic chamber via a piping branched from the first-mentioned piping at an intermediate location thereon, an idling lever turnably supported in the cylinder to be operable during a period of idling, the idling lever being turned by the piston displaced forwardly to abut against one foremost end thereof so as to allow the one-way valve for the first hydraulic chamber to be opened by the other foremost end thereof, and a lever for displacing the piston backward to a predetermined position where all the ports on the cylinder are opened during a period of engine braking, the lever being operatively connected to the piston via a connecting rod.

Further, there is provided according to another aspect of the present invention an automatic speed changing apparatus comprising at least one hydraulic pump on the driving side, the hydraulic pump being mounted on a driving shaft, a plurality of hydraulic motors on the driven side, the hydraulic pumps being mounted on a driven shaft in equally spaced relationship, a distributor comprising a cylinder and a piston slidably received in the cylinder which is formed with a plurality of ports corresponding to the hydraulic pump on the driving side and the hydraulic motors on the driven side in an equally spaced relationship as viewed in the axial direction, the piston being normally biased toward a head section of the cylinder under the effect of a predetermined intensity of resilient force of a coil spring, the head portion of the cylinder including a first hydraulic chamber and a second hydraulic chamber both of which are secured thereto in a side-by-side relationship, the first hydraulic chamber being communicated with the head section of the cylinder via a communication hole adapted to be closed with an one-way valve which is opened during a period of idling and the second hydraulic chamber being communicated with the first hydraulic chamber via a communication hole adapted to be closed with another one-way valve which is opened against the resilient force of a coil spring in the second hydraulic chamber when hydraulic pressure in the first hydraulic chamber is raised up to a predetermined level of pressure, a hydraulic oil collecting pipe having a large diameter to which a plurality of pipings are connected, one of the pipings being communicated with the suction port of the hydraulic pump on the driving side and the other ones being communicated with the delivery ports of the hydraulic motors on the driven side, the first-mentioned piping being communicated via the hydraulic pump on the driving side with a piping extending from the delivery side thereof to the port located nearest to the head section of the cylinder and the second-mentioned pipings being communicated via the hydraulic motors on the driven side with pipings extending from the suction ports thereof to the other ports on the cylinder, the hydraulic oil collecting pipe being communicated with the second hydraulic chamber via a piping branched from the first-mentioned piping at an intermediate location thereon, an idling lever turnably supported in the cylinder to be operable during a period of idling, the idling lever being turned by the piston displaced forwardly to abut against one foremost end thereof so as to allow the one-way valve for the first hydraulic chamber to be opened by the other foremost end thereof, and a plurality of bypass lines adapted to be operable during a period of engine braking, one ends of the bypass lines being communicated with the head section of the cylinder via a piping and the other ends of the same being communicated via pipings with the second-mentioned pipings at intermediate positions thereof with one-way valves disposed midway of the fourth-mentioned pipings, each of the one-way valves having a leaf spring secured thereto to be opened so as to allow hydraulic oil delivered via the third-mentioned piping to be introduced into the fourth-mentioned pipings therethrough when hydraulic pressure in the fourth-mentioned pipings is reduced to a level of negative pressure, a degree of resiliency of the leaf springs being so determined that the leaf springs located more remote from the head section of the cylinder exhibit a higher degree of resiliency.

The hydraulic pump on the driving side and the hydraulic motors on the driven side comprise a gear type hydraulic pump and motor, respectively.

It is preferable that the apparatus of the present invention further includes a member for adjusting an intensity of resilient force of the coil spring received in the cylinder.

In addition, it is preferable that the apparatus of the present invention further includes a tank for adjusting a quantity of working hydraulic oil.

Other objects, features and advantages of the present invention will be readily apparent from a reading of the following description which has been made with reference to the accompanying drawings.

BRIEF DESCRIPTION OF THE DRAWINGS

The present invention will be illustrated in the following drawings wherein:

FIG. 1 is a schematic view illustrating an automatic speed changing apparatus in accordance with an embodiment of the present invention;

DESCRIPTION OF THE PREFERRED EMBODIMENTS

Now, the present invention will be described in a greater detail hereinafter with reference to the accompanying drawings which illustrate preferred embodiments thereof.

Figure 1:
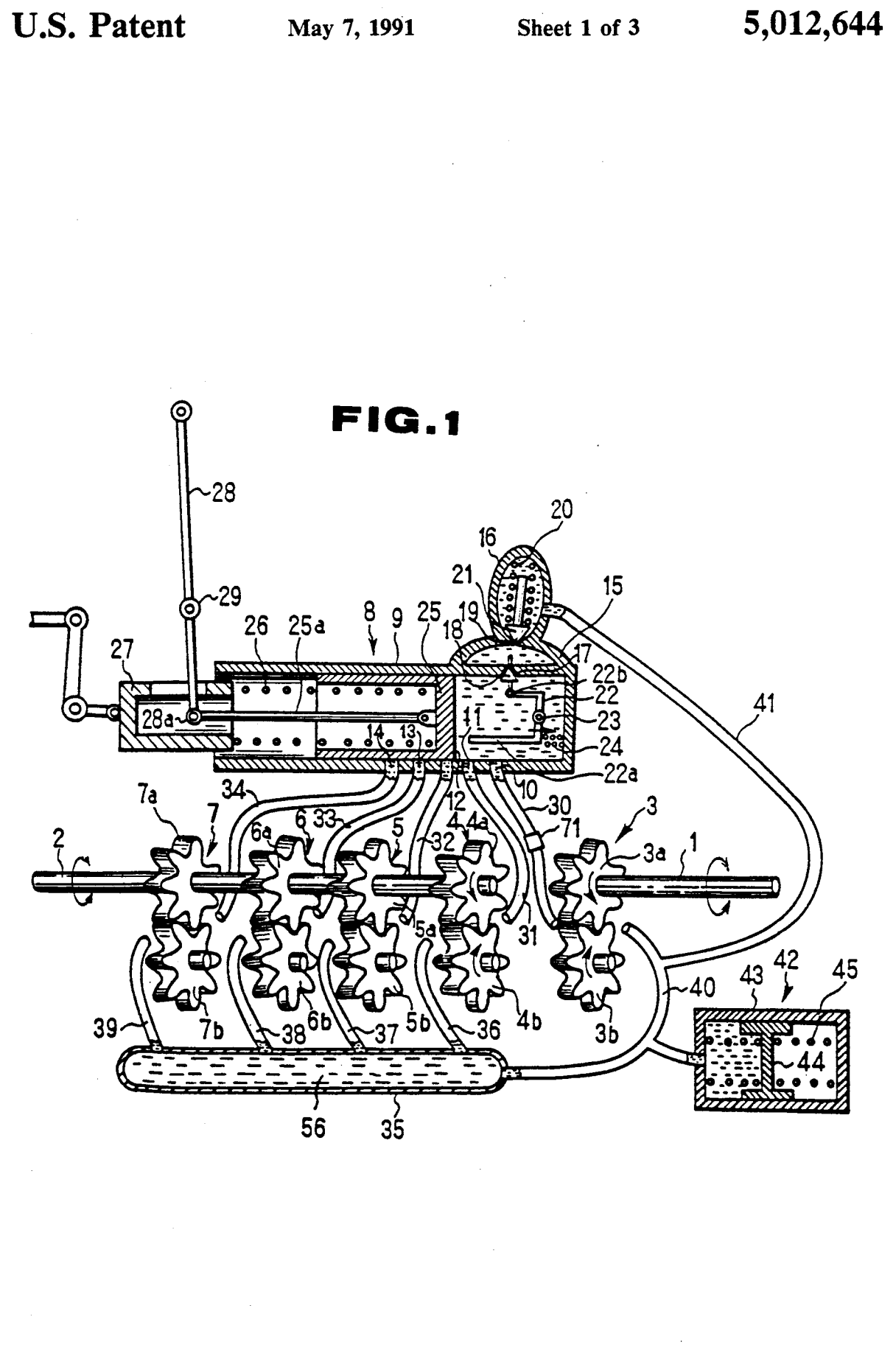
Figure 2:
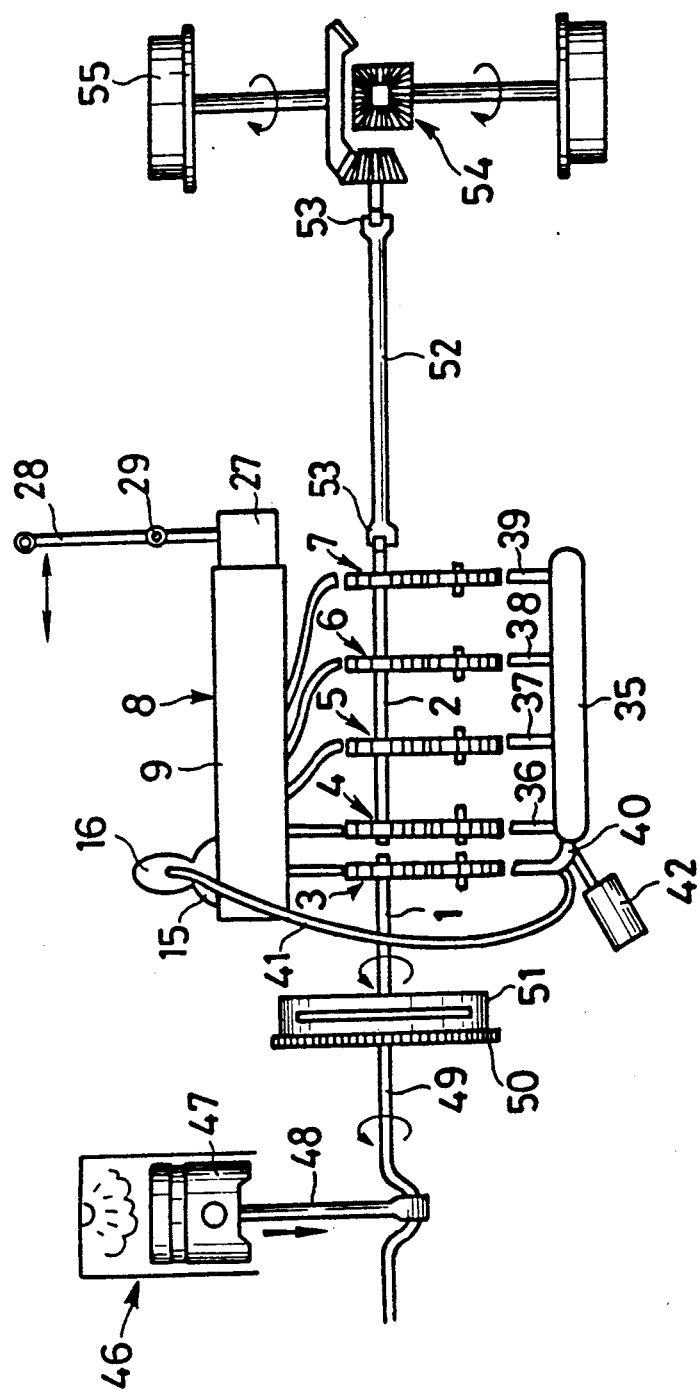
FIG. 2 is a schematic view illustrating that the apparatus is mounted on a motorcar.

In FIGS. 1 and 2, reference numeral 1 designates a driving shaft for transmitting a rotational driving force generated by an engine via a clutch and reference numeral 2 designates a driven shaft for transmitting the rotational driving force to driving wheels of a motorcar via a propeller shaft and a differential gear.

Reference numeral 3 designates a hydraulic pump disposed on the driving side. In the illustrated embodiment, a gear type hydraulic pump is employed for the hydraulic pump 3, and it is mounted on the driving shaft 1. It should be noted that for the sake of simplification of illustration only a driving gear 3a fixedly mounted on the driving shaft 1 and a following gear 3b meshing with the driving gear 3a are shown in the drawings but a casing in which both the gears 3a and 3b are accommodated is not shown there.

Reference numerals 4, 5, 6 and 7 designate hydraulic motors on the driven side, respectively. As is apparent from the drawings, a gear type hydraulic motor is employed for the respective hydraulic motors 4, 5, 6 and 7 which are arranged along the driven shaft 2 in equally spaced relationship. Similarly, only driving gears 4a, 5a, 6a and 7a and following gears 4b, 5b, 6b and 7b meshing with the driving gears 4a, 5a, 6a and 7a are shown in the drawings but casings in which the driving gears 4a, 5a, 6a and 7a and the following gears 4b, 5b, 6b and 7b are accommodated are not shown there for the same reason as the hydraulic pump 3 on the driving side.

Reference numeral 8 designates a distributor comprising a cylinder 9 and a piston adapted to slide in the cylinder, 9. The piston will be described in more detail later. The cylinder 9 is formed with a plurality of ports 10, 11, 12, 13 and 14 which are arranged in an equally spaced relationship as viewed in the axial direction. The port 10 corresponds to the hydraulic pump 3 on the driving side, while the port 11 corresponds to the hydraulic motor 4, the port 12 to the hydraulic motor 5, the port 13 to the hydraulic motor 6 and the port 14 to the hydraulic motor 7 on the driven side.

The cylinder 9 has a head section which includes a first hydraulic chamber 15 and a second hydraulic chamber 16 located above the first hydraulic chamber 15. The cylinder 9 and the first hydraulic chamber 15 are communicated with each other via a communication hole 17 in which a one-way valve 18 adapted to be opened only during a period of idling operation is disposed. In addition, the first hydraulic chamber 15 and the second hydraulic chamber 16 are communicated with each other via a communication hole 19 in which another one-way valve 21 adapted to be opened against the resilient force of a coil spring 20 when the pressure of a hydraulic oil in the first hydraulic chamber 15 is raised up to a predetermined level of pressure is disposed.

The one-way valve 18 is pivotally connected to the upper side 22b of a substantially U-shaped idling lever 22 of which an intermediate part is turnably supported by a pivotal shaft 23. As is apparent from FIG. 1, the lower side 22a of the idling lever 22 has a length which is dimensioned longer than that of the upper side 22b. The idling lever 22 is normally energized under the effect of resilient force of a coil spring 24 in such a manner that the foremost end of the lower side 22a is located substantially just above the port 11. It should be added that while the foregoing state is maintained, the communication hole 17 between the cylinder 9 and the first hydraulic chamber 15 is closed by the one-way valve 18.

Reference numeral 25 designates a piston adapted to slide in the cylinder 9. The piston 9 is normally biased toward the head section of the cylinder 9 under the effect of a predetermined intensity of resilient force of a coil spring 26. Incidentally, the coil spring 26 has an adequate magnitude of resiliency in order to assure that among the four ports 11, 12, 13 and 14 communicated with the hydraulic motors 4, 5, 6 and 7 on the driven side one or more ports are selectively opened or closed in response to a hydraulic pressure in the cylinder 9.

To adjust the resiliency of the coil spring 26, the automatic speed change apparatus is provided with a cylindrical resiliency adjusting member 27. Obviously, the resilient force of the coil spring 26 is increased more and more as it is increasingly compressed by introducing the cylindrical resiliency adjusting member 27 move deeply into the cylinder 9.

Reference numeral 28 designates a lever for displacing the piston 25 in the backward direction. The lever 28 is turnably supported by a pivotal shaft 29 which is located at an intermediate position thereof. The lower end 28a of the lever 28 is pivotally connected to a connecting rod 25a of the piston 25.

Actuating of the lever 28 may be manually performed by a driver or may be performed in operative association with a foot lever (not shown) to be depressed by him. Alternatively, it may be automatically performed using an electronically driven unit (not shown).

Reference numeral 30 designates a piping by way of which the delivery port of the hydraulic pump 3 on the driving side is communicated with the port 10 on the cylinder 9, reference numeral 31 designates a piping by way of which the port 11 on the cylinder 9 is communicated with the suction port of the hydraulic motor 4, reference numeral 32 is a piping by way of which the port 12 on the cylinder 9 is communicated with the suction port of the hydraulic motor 5, reference numeral 33 is a piping by way of which the port 12 on the cylinder 9 is communicated with the suction port of the hydraulic motor 6 and reference numeral 34 is a piping by way of which the port 14 on the cylinder 9 is communicated with the suction port of the hydraulic motor 7 on the driven side.

Reference numeral 35 designates a hydraulic oil collecting pipe having a large diameter to which a plurality of pipings 36, 37, 38 and 39 are connected so that it is communicated with the delivery ports of the respective hydraulic motors 4, 5, 6 and 7 on the driven side by way of the pipings 36, 37, 38 and 39.

Reference numeral 40 designates a piping by way of which the hydraulic oil collecting pipe 35 is communicated with the suction port of the hydraulic pump 3 on the driving side.

Reference numeral 41 designates a piping by way of which an intermediate location on the piping 40 is communicated with the second hydraulic chamber 16. Reference numeral 42 designates a tank for adjusting a quantity of working hydraulic oil which is provided midway of the piping 40 as required. The tank 42 serves also as an air vent. As is apparent from FIG. 1, the tank 42 is so constructed that a partition 44 is slidably received in a cylindrical casing 43 to stay at the substantially central position of the latter under the effect of a predetermined intensity of resilient force of a coil spring 45.

The automatic speed changing apparatus constructed in the above-described manner is mounted on a motorcar as shown in FIG. 2.

In FIG. 2, reference numeral 46 designates an engine, reference numeral 47 a piston, reference numeral 48 a connecting rod, reference numeral 49 a crankshaft, reference numeral 50 a flywheel, reference numeral 51 a clutch, reference numeral 52 a propeller shaft operatively connected to the driven shaft 2, reference numeral 53 a universal joint, reference numeral 54 a differential gear and reference numeral 55 driving wheels.

In FIG. 1, reference numeral 56 designates hydraulic oil.

Next, operations of the automatic speed changing apparatus of the present invention will be described below.

As the driving shaft 1 is rotated, pressurized hydraulic oil is introduced into the cylinder 9 of the distributor 8 by the hydraulic pump 3 on the driving side. Then, the piston 25 is displaced backward against the resilient force of the coil spring 26 under the effect of hydraulic pressure in the cylinder 9 so that hydraulic oil is delivered to hydraulic motors 4 to 7 via the ports 11 to 14 which have been successively opened by backward displacement of the piston 25. This causes the driving gears 4a to 7a to be rotated, resulting in the driven shaft 2 being rotated.

Next, description will be make below as to steps ranging from starting of forward movement to acceleration of the motorcar.

During a period of starting of forward movement, a large magnitude of torque is required due to a high intensity of rolling resistance to be overcome by wheels. As the number of revolutions of the engine is increased by depressing an acceleration pedal (not shown), a quantity of hydraulic oil delivered by the hydraulic pump 3 on the driving side is increased so that the inner pressure in the cylinder 9 is raised up correspondingly. This allow the piston 25 to be displaced backward against the resilient force of the coil spring 26 whereby the ports 11, 12, 13 and 14 are opened successively. The port 11 represents a position corresponding to top speed, port 12 a position corresponding to third speed, port 13 a position corresponding to second speed and port 14 a position corresponding to low speed. During a period of starting of forward movement, the piston 25 is usually displaced backward to the rearmost position where the port 14 is opened. Thus, four hydraulic motors 4, 5, 6 and 7 are brought in a parallel operating state so that a high magnitude of torque is generated. Now, the motorcar is ready to start its forward movement.

After the starting of forward movement, the motorcar is gradually accelerated so that rotational resistance of the driven shaft 2 is gradually reduced. This causes inner hydraulic pressure in the cylinder 9 to be gradually reduced whereby the piston 25 is gradually displaced in the forward direction under the effect of resilient force of the coil spring 26 in response to the reduction of the inner pressure. As the piston 25 is displaced forwardly in that way, the port 14 representative of the position corresponding to low speed, the port 13 representative of the position corresponding to second speed, the port 12 representative of the position corresponding to third speed and the port 11 representative of the position corresponding to top speed are successively closed with the piston 25 in accordance with the order of the ports 14, 13, 12 and 11. Obviously when the motorcar reaches the highest speed, hydraulic oil is fed only to the port 11.

In such a manner, speed changing is automatically performed via steps of starting of forward movement, acceleration, low speed and top speed. In addition, engine braking is achieved in the following manner.

While the motorcar runs downhill, the driven shaft 2 serves as an output shaft in contrast with a period of normal running. In detail, the driven shaft 2 is caused to rotate with a high intensity of rotational force so that the driving gears 4a, 5a, 6a and 7a in the hydraulic motors 4, 5, 6 and 7 on the driven side are rotated. This causes hydraulic oil having a high pressure to be delivered from the hydraulic motors 4, 5, 6 and 7 on the driven side. However, since the engine is rotated with the reduced number of revolutions while the motorcar runs downhill, the result is that the driving shaft 1 has a small quantity of rotation per unit time and thereby the hydraulic pump 3 on the driving side has a small quantity of sucked hydraulic oil. Consequently, the hydraulic oil collecting pipe 35 and the piping 40 have an increased hydraulic pressure and the cylinder 9 remains in a negative pressure state whereby rotational force of the respective driving gears 4a, 5a, 6a and 7a in the hydraulic motors 4, 5, 6 and 7 on the driven side is suppressed and rotational force of the driven shaft 2 is suppressed also.

It should be noted that an effect of engine braking can be increased more and more as the number of hydraulic motors on the driven side is increased and that all the hydraulic motors 4, 5, 6 and 7 are operated in unison when the motorcar runs downhill. At this moment, the piston 25 may be displaced backward by actuating the lever 28.

Finally, description will be made below as to operations of the speed changing apparatus during a period of idling.

Since the engine has a reduced number of revolutions while it is rotated in an idling state, the hydraulic pump 3 on the driving side has a small quantity of hydraulic oil delivered therefrom. This permits the piston 25 to move forwardly under the effect of resilient force of the coil spring 26 until all the ports 11 to 14 are closed by piston 25.

At this moment, the piston 25 thrusts the lower side 22a of the idling lever 22 so that the latter is turned about the shaft 23. This causes the one-way valve 18 pivotally attached to the upper side 22b of the idling lever 22 to be displaced into the interior of the cylinder 9, resulting in the communication hole 17 being opened. Consequently, hydraulic oil from cylinder 9 into the cylinder 9 is caused to flow in the first hydraulic chamber 15 via the communication hole 17 so that it biases the one-way valve 21 against resilient force of the coil spring 20. This permits hydraulic oil in the first hydraulic chamber 15 to flow into the second hydraulic chamber 16. Hydraulic oil which has flowed into the second hydraulic chamber 16 is delivered to the suction port of the hydraulic pump 3 on the driving side via the piping 41 so that it is recirculated.

In the foregoing embodiment, the piston 25 is displaced backward by actuating the lever 28 during a period of engine braking. However, the present invention is not limited only to this. Alternatively, a plurality of bypass lines as shown in FIG. 3 may be used in place of the lever 28 in accordance with another embodiment of the present invention.

Figure 3:
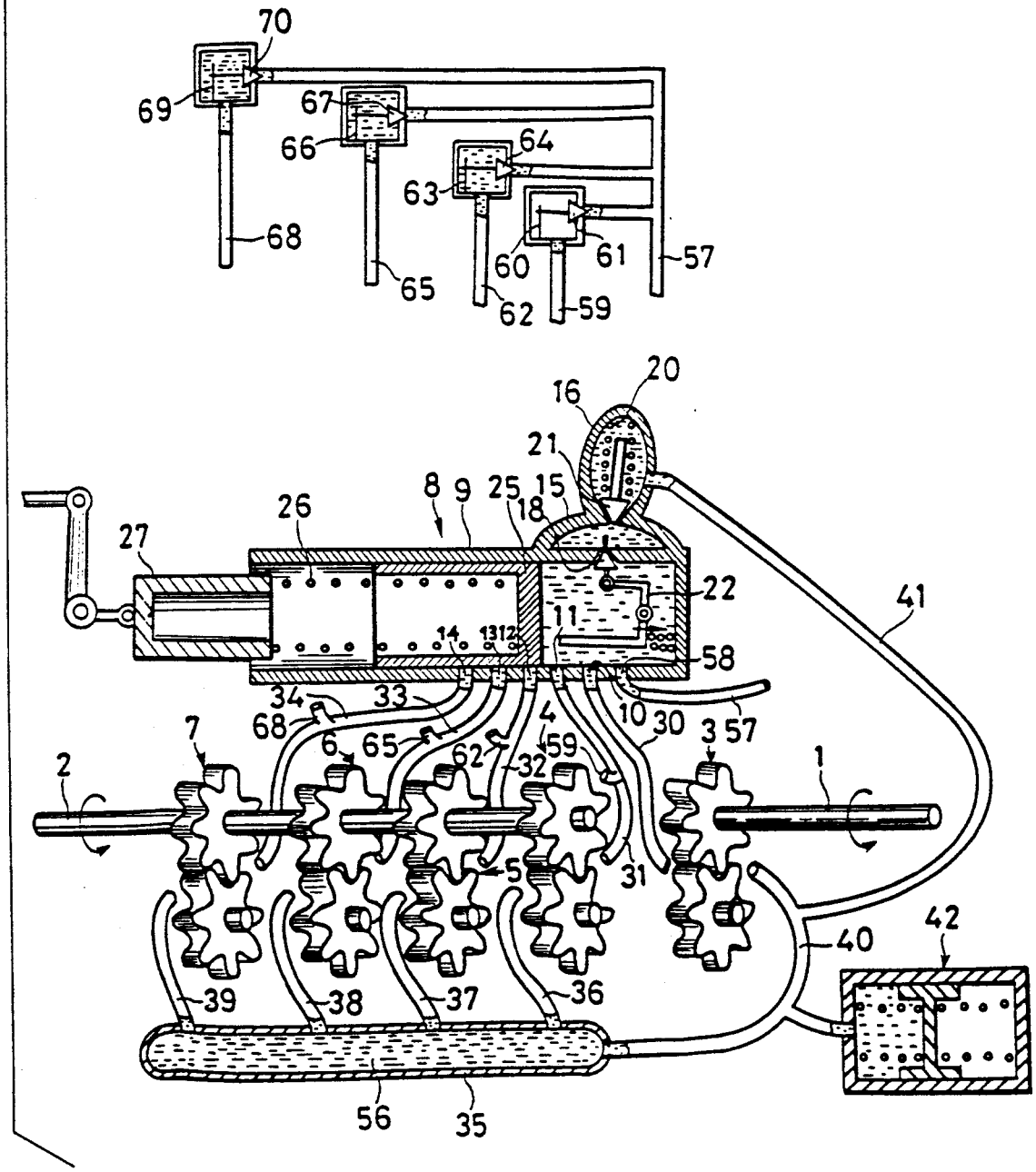
FIG. 3 is a schematic view illustrating an automatic speed changing apparatus in accordance with another embodiment of the present invention.

In FIG. 3, reference numeral 57 designates a piping which leads to a port 58 located forwardly of the port 11 in the head section of the cylinder 9. Reference numeral 59 designates a piping of which one end is connected to the piping 57 and of which the other end is connected to an intermediate location on the piping 31. As is apparent from the drawing, an one-way valve 61 having a leaf spring 60 secured thereto is provided midway of the piping 59. The one-way valve 61 is adapted to open when the piping 59 has a negative pressure so that hydraulic oil delivered via the piping 57 is introduced into the piping 59 via the one-way valve 61. Reference numeral 62 designates a piping of which one end is connected to the piping 57 and of which the other end is connected to an intermediate location on the piping 32. A one-way valve 64 including a leaf spring 63 having a higher intensity of resilient force than that of the leaf spring 60 for the one-way valve 61 is provided midway of the piping 62. Reference numeral 65 designates a piping of which one end is connected to the piping 57 and of which the other end is connected to an intermediate location on the piping 33. Similarly, one-way valve 67 including a leaf spring 66 having a higher intensity of resilient force than that of the leaf spring 63 for the one-way valve 64 is provided midway of the piping 65. Further, reference numeral 68 designates a piping of which one end is connected to the piping 57 and of which the other end is connected to an intermediate location on the piping 34. Similarly, one-way valve 70 including a leaf spring 69 having a higher intensity of resilient force than that of the leaf spring 66 for the one-way valve 67 is provided midway of the piping 68.

With such construction, operations of the speed changing apparatus in accordance with this modified embodiment are performed in the same manner as the first-mentioned embodiment in FIG. 1. Specifically, when the driven shaft 2 is rotated in the form of an output shaft while a motorcar runs downhill, the respective pipings 59, 62, 65 and 68 are brought into a negative pressure state whereby rotational force of the respective driving gears 4a, 5a, 6a and 7a is suppressed and thereby rotational force of the driven shaft 2 is also suppressed.

It should be noted that when all the one-way valves 61, 64, 67 and 70 are opened, engine braking is achieved with the highest intensity. Since the respective one-way valves 61, 64, 67 and 70 are so constructed that they are operated by a pressure which is successively increased in accordance with the order of the one-way valves 61, 64, 67 and 70, i.e. each of them is automatically opened in dependence on the current rotational force of the driven shaft 2.

Each of the hydraulic motors 5, 6 and 7 on the driven side has an one-way clutch (not shown) incorporated therein which permits the motorcar to run only in one direction. It may be kept inoperative during a period of engine braking.

In FIG. 1, reference numeral 71 designates a flow rate control valve which is operable during a period of engine braking to control a flow rate in correspondence to a required quantity of braking force.

As will be readily apparent from the foregoing description, the automatic speed changing apparatus provides the following advantageous effects.

1. Since speed changing is automatically performed from the starting of forward movement until an accelerated state is reached, there is no need of stepwise disengaging a clutch from the engaged state. Thus, time and labor required for the above disengagement can be eliminated.

2. Since there is no need of depressing an acceleration pedal when the clutch is disengaged from an engaged state or it is brought in the engaged state, fuel is not consumed uselessly.

3. In contrast with a conventional manual type speed changing apparatus, energy is not consumed uselessly when the clutch is disengaged from an engaged state or it is brought into the engaged state.

4. Speed changing is very smoothly performed from the starting of forward movement until an accelerated state is reached, resulting in a property of acceleration being improved remarkably.

5. The apparatus can be manufactured at an inexpensive cost, because only a plurality of hydraulic pumps and motors a cylinder and a piston constitute main components for the apparatus.

6. The apparatus can be designed and constructed in small dimensions.

7. Very little noisy sound is generated during a period of operation of the apparatus.

8. The number of steps of speed changing can be increased as required by increasing the number of ports on the cylinder as well as the number of hydraulic motors on the driven side.

While the present invention has been described above with respect to two preferred embodiments, it should of course be understood that it is not limited only to them. Alternatively, various changes or modifications may be made in a suitable manner without departure from the scope of the present invention as defined by the appended claims.

I claim:

1. An automatic speed changing apparatus comprising;

at least one hydraulic pump on the driving side having suction and outlet ports and being mounted on a driving shaft operatively connected to an engine drive shaft;

a plurality of hydraulic motors on the driven side, said hydraulic motors being mounted on a driven shaft in equally spaced relationship and each motor having inlet and outlet ports;

a distributor comprising a cylinder and a piston slidably, received in said cylinder, a plurality of distributor ports in the cylinder corresponding to the hydraulic pump on the driving side and the hydraulic motors on the driven side in equally spaced relationship in the axial direction of the cylinder, a head section in the cylinder, said piston being normally biased toward said head section of the cylinder by a predetermined intensity of resilient force of a coil spring, said head portion of the cylinder including a first hydraulic chamber and a second hydraulic chamber secured to said cylinder in a side-by-side relationship, said first hydraulic chamber communicating with the head section of the cylinder via a communication hole adapted to be closed by a first one-way valve which is opened only during a period of idling and said second hydraulic chamber communicating with the first hydraulic chamber via a communication hole adapted to be closed by a second one-way valve which is opened against the resilient force of a coil spring in the second hydraulic chamber when hydraulic pressure in the first hydraulic chamber is raised to a predetermined level of pressure;

a hydraulic oil collecting pipe having a large diameter to which a plurality of pipings are connected, one of said pipings communicating with the suction port of the hydraulic pump and the other pipings communicating with the outlet ports of the hydraulic motors, said one piping communicating via the hydraulic pump with a piping extending from the outlet port thereof to the distributor port located nearest to the head section of the cylinder and the other pipings communicating via said hydraulic motors with motor inlet pipings extending from the inlet ports of said motors to the other distributor ports in the cylinder, said hydraulic oil collecting pipe communicating with the second hydraulic chamber via a branch piping connecting said one piping at an intermediate location thereon to said second hydraulic chamber;

an idling lever connected at one end to said first one-way valve and pivotally supported in the cylinder to be operated during a period of idling, said idling lever being pivoted by the piston when displaced forwardly toward the head section to abut against a second end of said lever to open said first one-way valve in the first hydraulic chamber; and a piston operating lever for displacing the piston axially in the cylinder to predetermined selected positions where selected distributor ports in the cylinder are opened and closed during normal operation and during a period of engine braking, said lever being operatively connected to the piston via a connecting rod.

2. An automatic speed changing apparatus as claimed in claim 1, wherein the hydraulic pump on the driving side and the hydraulic motors on the driven side comprise a gear type hydraulic pump and gear type hydraulic motors, respectively.

3. An automatic speed changing apparatus as claimed in claimed in claim 2, wherein said apparatus further comprises means for adjusting the resilient force of said coil spring acting on said piston.

4. An automatic speed changing apparatus as claimed in claim 3, wherein said apparatus further comprises tank means for adjusting a quantity of working hydraulic oil.

5. An automatic speed changing apparatus as claimed in claim 2, wherein said apparatus further comprises tank means for adjusting a quantity of working hydraulic oil.

6. An automatic speed changing apparatus as claimed in claim 1, wherein said apparatus further comprises means for adjusting the resilient force of said coil spring acting on said piston.

7. An automatic speed changing apparatus as claimed in claim 1, wherein said apparatus further comprises tank means for adjusting a quantity of working hydraulic oil.

8. An automatic speed changing apparatus comprising;

at least one hydraulic pump on the driving side having suction and outlet ports and being mounted on a driving shaft operatively connected to an engine drive shaft;

a plurality of hydraulic motors on the driven side, said hydraulic motors being mounted on a driven shaft in equally spaced relationship and each motor having inlet and outlet ports;

a distributor comprising a cylinder and a piston slidably received in said cylinder, a plurality of distributor ports in the cylinder corresponding to the hydraulic pump on the driving side and the hydraulic motors on the driven side in equally spaced relationship in the axial direction of the cylinder, a head section in the cylinder, said piston being normally biased toward said head section of the cylinder by a predetermined intensity of resilient force of a coil spring, said head portion of the cylinder including a first hydraulic chamber and a second hydraulic chamber secured to said cylinder in a side-by-side relationship, said first hydraulic chamber communicating with the head section of the cylinder via a communication hole adapted to be closed by a first one-way valve which is opened only during a period of idling and said second hydraulic chamber communicating with the first hydraulic chamber via a communication hole adapted to be closed by a second one-way valve which is opened against the resilient force of a coil spring in the second hydraulic chamber when hydraulic pressure in the first hydraulic chamber is raised to a predetermined level of pressure;

a hydraulic oil collecting pipe having a large diameter to which a plurality of pipings are connected, one of said pipings communicating with the suction port of the hydraulic pump and the other pipings communicating with the outlet ports of the hydraulic motors, said one piping communicating via the hydraulic pump with a piping extending from the outlet port thereof to the distributor port located nearest to the head section of the cylinder and the other pipings communicating via said hydraulic motors with motor inlet pipings extending from the inlet ports of said motors to the other distributor ports in the cylinder, said hydraulic oil collecting pipe communicating with the second hydraulic chamber via a branch piping connecting said one piping at an intermediate location thereon to said second hydraulic chamber;

an idling lever connected at one end to said first one-way valve and pivotally supported in the cylinder to be operated during a period of idling, said idling lever being pivoted by the piston when displaced forwardly toward the head section to abut against a second end of said lever to open said first one-way valve in the first hydraulic chamber; and a plurality of hydraulic oil bypass lines adapted to be operable during a period of engine braking, one end of each bypass line communicating with the head section of the cylinder via pipings and the other end of each bypass line communicating with a respective one of the pipings connected to said hydraulic motor inlets at intermediate positions thereof, one-way bypass valves disposed midway in said bypass lines, each of said one-way bypass valves being controlled by a leaf spring connected thereto so that said one-way bypass valves are opened to allow hydraulic oil delivered from the head section of the cylinder to flow into said hydraulic motor inlet pipings when hydraulic pressure in said inlet pipings is reduced to a level of negative pressure, said leaf springs having different predetermined resiliencies so that the leaf springs of one-way bypass valves connected to distributor ports more remote from the head section of the cylinder have a relatively higher resilient force than leaf springs of bypass valves located nearer said head section.

9. An automatic speed changing apparatus as claimed in claim 8, wherein the hydraulic pump on the driving side and the hydraulic motors on the driven side comprise a gear type hydraulic pump and gear type hydraulic motors, respectively.

10. An automatic speed changing apparatus as claimed in claim 9, wherein said apparatus further comprises means for adjusting the resilient force of said coil spring acting on said piston.

11. An automatic speed changing apparatus as claimed in claim 10, wherein said apparatus further comprises tank means for adjusting a quantity of working hydraulic oil.

12. An automatic speed changing apparatus as claimed in claim 9, wherein said apparatus further comprises tank means for adjusting a quantity of working hydraulic oil.

13. An automatic speed changing apparatus as claimed in claim 8, wherein said apparatus further comprises means for adjusting the resilient force of said coil spring acting on said piston.

14. An automatic speed changing apparatus as claimed in claim 13, wherein said apparatus further comprises tank means for adjusting a quantity of working hydraulic oil.

15. An automatic speed changing apparatus as claimed in claim 8, wherein said apparatus further comprises tank means for adjusting a quantity of working hydraulic oil.

* * * * *